United States Patent
Baldwin et al.

(10) Patent No.: US 9,710,459 B2
(45) Date of Patent: Jul. 18, 2017

(54) COMMUNICATION MONITORING BASED ON SENTIMENT

(71) Applicant: International Business Machines Corporation, Armonk, NY (US)

(72) Inventors: Timothy J. Baldwin, Fareham (GB); Andrew Johnson, Winchester (GB); Peter J. Johnson, Eastleigh (GB); Fenglian Xu, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 14/828,553

(22) Filed: Aug. 18, 2015

(65) Prior Publication Data

US 2017/0052949 A1 Feb. 23, 2017

(51) Int. Cl.
*G06F 17/27* (2006.01)
*G06F 17/20* (2006.01)
*G06F 17/22* (2006.01)
*H04L 12/58* (2006.01)

(52) U.S. Cl.
CPC ...... *G06F 17/2785* (2013.01); *G06F 17/2211* (2013.01); *H04L 51/12* (2013.01)

(58) Field of Classification Search
None
See application file for complete search history.

(56) References Cited

U.S. PATENT DOCUMENTS

| | | | |
|---|---|---|---|
| 8,805,937 B2 | 8/2014 | Bendel et al. | |
| 8,838,438 B2 | 9/2014 | Leary et al. | |
| 9,336,268 B1 * | 5/2016 | Moudy | G06F 17/30412 |
| 9,386,110 B2 * | 7/2016 | Cudak | H04L 67/22 |
| 2008/0120411 A1 | 5/2008 | Eberle | |
| 2009/0006366 A1 * | 1/2009 | Johnson | G06F 17/30707 |

(Continued)

FOREIGN PATENT DOCUMENTS

WO    2014001938 A1    1/2014

OTHER PUBLICATIONS

Van Grove, "Plugin Prevents Your Passive Aggressive E-mails From Going Out", Mashable, Mar. 9, 2011, http://mashable.com/2011/03/09/tonecheck-update/, pp. 1-38.

(Continued)

*Primary Examiner* — Marcus T Riley
(74) *Attorney, Agent, or Firm* — Michael O'Keefe

(57) ABSTRACT

Method and system are provided for communication monitoring based on sentiment. The method includes: monitoring a new communication prior to sending created by a sender to a recipient, wherein the new communication includes text input by the sender; and analyzing the text of the new communication using sentiment analysis and determining a sentiment score on a scale between negative sentiment and positive sentiment. In response to the sentiment score for the text of the new communication being on the negative side of a predefined threshold on the scale, referencing an overall relationship score based on past communications between the sender and the recipient. In response to the overall relationship score being on the negative side of a predefined threshold, holding a transmission of the new communication for further review.

20 Claims, 7 Drawing Sheets

(56) References Cited

U.S. PATENT DOCUMENTS

| | | | |
|---|---|---|---|
| 2009/0254620 A1* | 10/2009 | Best | G06Q 10/107 709/206 |
| 2010/0082751 A1 | 4/2010 | Meijer et al. | |
| 2010/0174813 A1 | 7/2010 | Hildreth et al. | |
| 2010/0223581 A1 | 9/2010 | Manolescu et al. | |
| 2011/0078157 A1* | 3/2011 | Sun | G06Q 30/02 707/749 |
| 2012/0117019 A1 | 5/2012 | Wolf et al. | |
| 2012/0179751 A1 | 7/2012 | Ahn et al. | |
| 2014/0108560 A1* | 4/2014 | Samdahl | H04L 12/1859 709/206 |
| 2014/0172415 A1 | 6/2014 | Jo | |
| 2015/0264145 A1* | 9/2015 | Cudak | H04L 67/22 715/753 |
| 2015/0264146 A1* | 9/2015 | Cudak | H04L 67/22 379/142.01 |
| 2016/0300135 A1* | 10/2016 | Moudy | G06F 17/30412 |

OTHER PUBLICATIONS

Thelwall et al., "Sentiment strength detection in short informal text", Wiley, Research Article, Abstract, Journal of the American Society for Information Science and Technology, vol. 61, Issue 12, pp. 1-3, Dec. 2010, Printed on May 5, 2015.

* cited by examiner

COMMUNICATION MONITORING BASED ON SENTIMENT

BACKGROUND

The present invention relates to communication monitoring, and more specifically, to communication monitoring based on sentiment.

Modern communication is very easy to send by many different technologies. Communication may include email messages, instant messaging messages, social media posts, etc.

Frequently, a communication is sent which the sender may regret. The sender may regret the communication immediately, on reflection of the content, on receipt of a response, etc.

People can be very emotional at the time they see a malicious, hurtful, or unpleasant message against them, and they may react immediately by fighting back with a defensive or offensive response. However, if they tried to calm down for a while and reflected they may decide not to send this defensive or offensive communication.

If a sender overreacts and sends a rude or blunt communication, this could cause a business or relationship impact.

A negative communication may be particularly harmful if sent to a recipient with whom the sender already has a strained or difficult relationship.

People often regret sending or responding immediately to communications, especially if they have had a previously bad relationship with the recipient.

Therefore, there is a need in the art to address the aforementioned problems.

SUMMARY

According to a first aspect of the present invention there is provided a computer-implemented method for communication monitoring based on sentiment, comprising: monitoring a new communication prior to sending created by a sender to a recipient, wherein the new communication includes text input by the sender; analyzing the text of the new communication using sentiment analysis and determining a sentiment score on a scale between negative sentiment and positive sentiment; in response to the sentiment score for the text of the new communication being on the negative side of a first predefined threshold on the scale, referencing an overall relationship score based on past communications between the sender and the recipient; and in response to the overall relationship score being on the negative side of a second predefined threshold, holding the transmission of the new communication or activating another action.

This method provides the advantage of preventing the sending of a communication if the sentiment of the communication is considered to be negative and the sender has a historically bad relationship with the recipient.

The overall relationship score may be generated by carrying out sentiment analysis on text content of past communications between the sender and the recipient and determining a sentiment score on a scale between negative sentiment and positive sentiment. Sentiment analysis of past communications may provide a sentiment score or indication of the relationship.

In an embodiment, the overall relationship score may be generated from past communication between the sender and the recipient from multiple communication channel sources. The overall relationship score may be a weighted average across the multiple communication channel sources. The multiple communication channel sources may include sources from a group of: email communication channels, instant messaging communication channels, short message service communication channels, social media network communication channels, online forum channels, and other forms of communication channel sent from a computing device or mobile communication device.

The use of multiple communication channel sources has the advantage of providing an overall view of a relationship which may be more indicative of the negative or positive nature of the relationship.

The method may include updating the overall relationship score with the sentiment score for the new communication.

The method may further include, in response to the overall relationship score being on the negative side of a predefined threshold, sending a notification to one or both of the sender and a supervisor.

The method may include resubmitting an amended new communication for analyzing the text of the amended new communication using sentiment analysis and determining a sentiment score on a scale between negative sentiment and positive sentiment.

The method may include selecting a signature for the communication from a plurality of signatures each having a different sentiment, wherein the selection is based on the sentiment score of the new communication.

This provides the advantage of tailoring the signature to the sentiment of the communication.

According to another aspect of the present invention there is provided a system for communication monitoring based on sentiment, including: a processor and a memory configured to provide computer program instructions to the processor to execute the function of the components, including: a communication monitoring component for monitoring a new communication prior to sending created by a sender to a recipient, wherein the new communication includes text input by the sender; a new communication analysis component for analyzing the text of the new communication using sentiment analysis and determining a sentiment score on a scale between negative sentiment and positive sentiment; an historical analysis access component for, in response to the sentiment score for the text of the new communication being on the negative side of a predefined threshold on the scale, referencing an overall relationship score based on past communications between the sender and the recipient; and an output component for, in response to the overall relationship score being on the negative side of a predefined threshold, holding the transmission of the new communication or activating another action.

The system may include an historical analysis system for generating the overall relationship score, including: a sentiment analysis component for carrying out sentiment analysis on text content of past communications between the sender and the recipient and determining a sentiment score on a scale between negative sentiment and positive sentiment.

In an embodiment, the historical analysis system may access past communications between the sender and the recipient from multiple communication channel sources. The historical analysis system may include an averaging component and the overall relationship score is a weighted average across the multiple communication channel sources. The multiple communication channel sources may include sources from the group of: email communication channels, instant messaging communication channels, short message service communication channels, social media network communication channels, online forum channels, and other forms of communication channel sent from a computing device or mobile communication device.

The historical analysis system may include an update component for updating the overall relationship score with the sentiment score for the new communication.

The output component may be for sending a notification to one or both of the sender and a supervisor.

The system may further include a signature component for selecting a signature for the communication from a plurality of signatures each having a different sentiment, wherein the selection is based on the sentiment score of the new communication.

In an embodiment, the communication monitoring component for monitoring a new communication prior to sending created by a sender to a recipient may be provided in a communication component. The communication component may be one of the group of: an email communication component, an instant messaging communication component, a short message service communication component, a social media network communication interface, a browser for online forums, and other forms of communication components available from a computing device or mobile communication device.

In an alternative embodiment, the communication monitoring component for monitoring a new communication prior to sending created by a sender to a recipient may be provided by an operating system of a computing device or a mobile communication device.

According to another aspect of the present invention there is provided a computer program product for communication monitoring based on sentiment, the computer program product comprising a computer readable storage medium having program instructions embodied therewith, the program instructions executable by a processor to cause the processor to: monitor a new communication prior to sending created by a sender to a recipient, wherein the new communication includes text input by the sender; analyze the text of the new communication using sentiment analysis and determining a sentiment score on a scale between negative sentiment and positive sentiment; in response to the sentiment score for the text of the new communication being on the negative side of a predefined threshold on the scale, reference an overall relationship score based on past communications between the sender and the recipient; and in response to the overall relationship score being on the negative side of a predefined threshold, hold the transmission of the new communication or activate another action.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system may use a variety of communication sources to determine historical relationships between individuals using sentiment analysis of previous interactions. When a sender is composing a new communication that contains negative sentiment, a mechanism is provided which determines the sender's historical relationship based on previous communications with the recipient to determine their relationship and take appropriate action.

Sentiment analysis is carried out of a current communication intending to be sent to a recipient. In addition, previous communications between the sender and the recipient are analyzed and the historical relationship between the sender and the recipient evaluated. The previous communications may include interactions via social media networks, other communication channels and/or the current communication channel. The outcome is that if the historical relationship is shown to be negative, the current communication may be held or delayed, or an alert may be activated to the sender, a manger or a supervisor.

Figure 1:
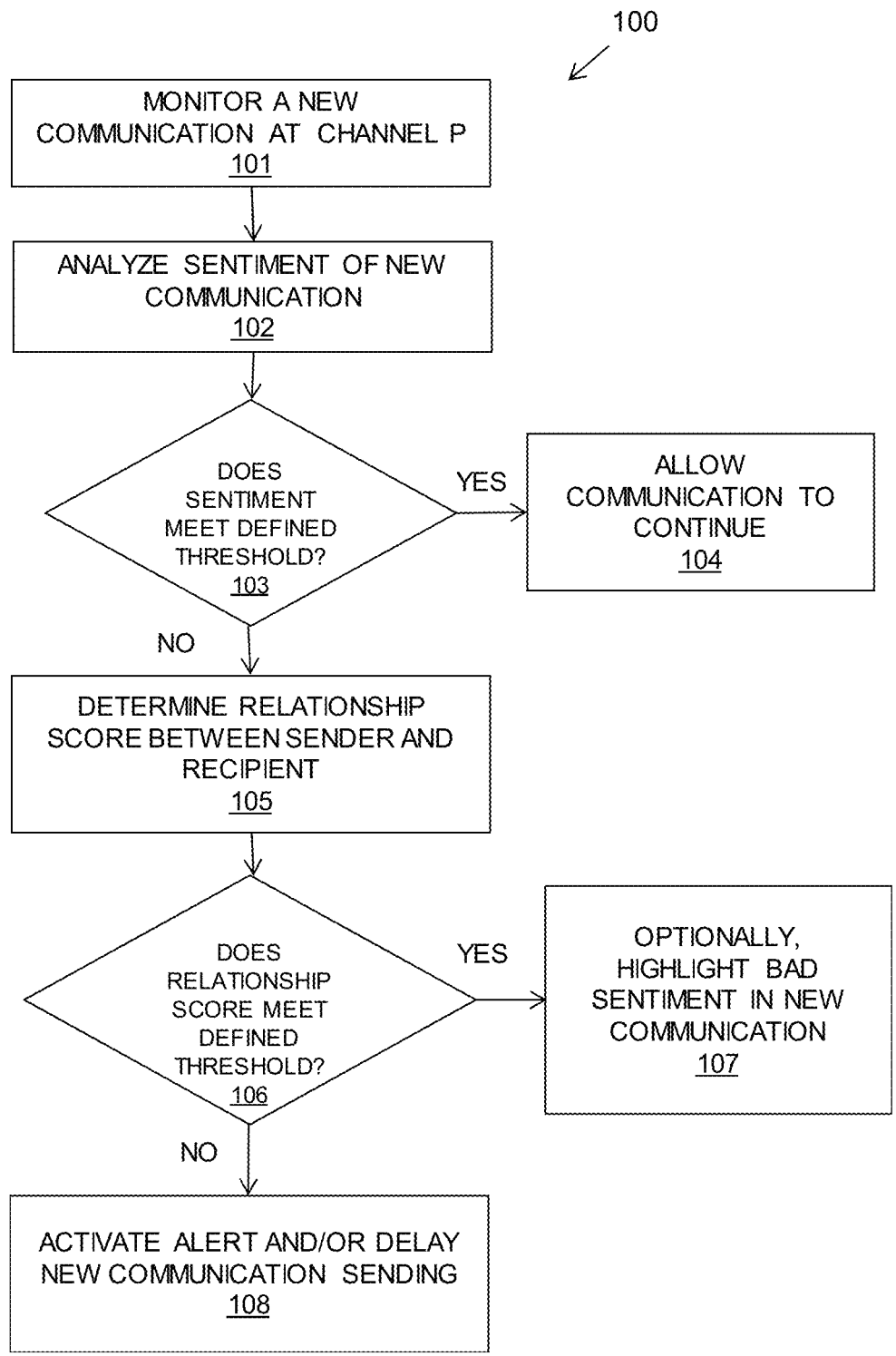
FIG. 1 is a flow diagram of an example embodiment of an aspect of a method in accordance with the present invention.

Referring to FIG. 1, a flow diagram 100 shows an example embodiment of an aspect of the described method of evaluating a current communication. The method may be carried out by a computer software application provided as an extension to a communication system, or at a higher level across different communication systems, for example as provided by an operating system or an umbrella software application. The method may be implemented as a service with various user interfaces, which may be integrated with different tools.

A new communication may be generated using a channel of communication, referred to as channel P. The channel of communication may be in the form of a variety of communication mechanisms or technologies, for example, an email communication, a short message service (SMS) communication, an instant messaging communication, a social media post, a response on an online forum, etc. The channel of communication may be a direct one-to-one communication, such as email or SMS, or may be an open channel such as a social media post on which multiple individuals or even the public may comment or respond.

The new communication may be monitored 101 prior to sending. The monitoring may include analysis 102 of the sentiment of the communication. Analysis of the sentiment of a text may be carried out in using various methods of natural language processing, text analysis, computational linguistics, keywords, etc. Known approaches include keyword spotting, lexical affinity, statistical methods including machine learning, and concept-level techniques. Publicly available resources may be used such as a sentiment analysis tool.

Sentiment analysis may classify the content of a given text as in a range from negative to positive, which may include sentiment from highly negative, through averagely negative to slightly negative, to neutral, to slightly positive, to averagely positive, to highly positive. The analysis may result in a score on a scale of negative to positive sentiment, for example from −10 to +10, or 0 to 5. The scale may equally be from positive to negative.

It may be determined 103 if the sentiment of the new communication meets a defined threshold or level of sentiment. For example, the threshold may be a score on the scale of negative to positive sentiment, which the communication must fall on the positive side of. In an example, the threshold may be a neutral sentiment and any negative sentiment may be determined as not meeting the required level. On the other hand, a slightly negative sentiment may be allowed.

The threshold or level may be configured by a user or administrator and may be variable for different users or groups of users. For example, in a business environment a new member of staff may have a high threshold set requiring that communications are of a positive sentiment.

If the new communication meets the threshold, the new communication is allowed 104 to continue and to be transmitted.

In an optional additional step, an appropriate signature may be selected for the new communication based on the positive sentiment. For example, a selection of signatures may be available and may include content based on sentiment, such as a greeting or a photograph with an expression. A positive greeting and smiling photograph may be used for a positive sentiment communication.

If the new communication does not meet the threshold, a relationship score between the sender and the recipient is determined 105. The relationship score may be a one-way relationship in which only the communications from the sender to the recipient are analyzed and scored, or may be a two-way relationship in which communications from the recipient to the sender are also included.

The relationship score may be generated from only the present communication channel, or may use multiple communication channels as sources of relationship information. For example, if the new communication uses the communication channel of email communication, the relationship score may be based solely on the previous communications via email, or may be based on various sources of different communication channels such as SMS messages, instant messaging, social media networks as well as email communication.

The relationship score may be determined by accessing a previously generated relationship score based on past communications between the sender and recipient. In an embodiment, the new communication's sentiment may also be added to the relationship score.

It may be determined 106 if the relationship score meets a defined threshold. For example, the threshold may be a score on the scale of negative to positive sentiment and a relationship score may fall on the positive side or the negative side of the threshold. This is similar to the threshold measured for the new communication but may have a different threshold or sentiment level.

The relationship score threshold may be configured by a user or administrator and may be variable for different users or groups of users. For example, even a slightly negative past relationship score may activate the described method of reviewing the new communication. In another example, a sender may have a very solid relationship with the recipient and know that robust exchanges of view are acceptable and will not cause offence.

If the relationship score is determined to meet the threshold, in that it is sufficiently positive, further action 107 may optionally be taken to delay or highlight the negative sentiment of the new communication depending on configuration settings of the system.

In an optional additional step, an appropriate signature may be selected for the new communication if it is sent with a negative sentiment. For example, a selection of signatures may be available and may include content based on sentiment, such as a greeting or a photograph with an expression. A neutral greeting and an unsmiling photograph may be used for a negative sentiment communication.

If the relationship score is determined to not meet the threshold, in that it is sufficiently negative, an action may be taken 108 to hold the new communication and review this. This action may include an alert to a supervisor or to the sender him or herself.

If the sender amends or rewords the new communication, the amended communication may then be re-analyzed at step 102 to determine the new score for the amended communication and this may be notified to the sender or administrator. If the amended communication still does not meet the required threshold of sentiment, a further alert may be issued. A manager or supervisor may override the holding of a communication if it is decided that the negative sentiment is appropriate.

If it is decided to send the new communication with a negative sentiment, as an optional step, an appropriate signature may be selected for the new communication if it is sent with a negative sentiment as discussed at step 107.

Figure 2:
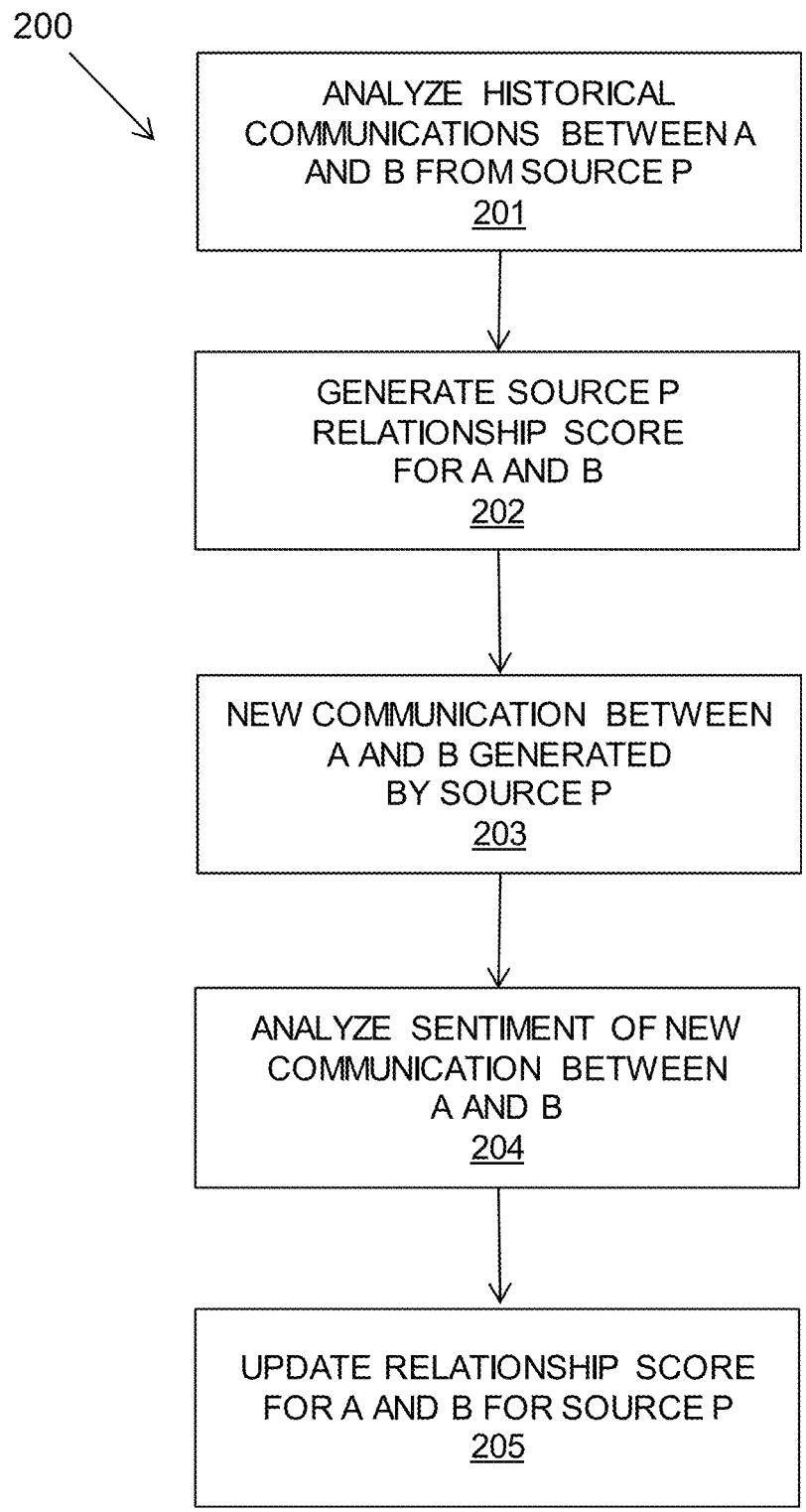
FIG. 2 is a flow diagram of an example embodiment of an aspect of a method in accordance with the present invention.

Referring to FIG. 2, a flow diagram 200 shows an example embodiment of an aspect of the described method of generating historical relationship data. In this example, a single source of communications is used, such as email communications or social media posts.

An analysis 201 of historical communications may be carried out between a user A and a user B using a source of communication P. The communications that are analyzed may be in a one-way direction from the user A to user B or may be communications in either direction between the user A and the user B. In the context of social media communication, a communication may be included which refers to the other party, for example, @janebrown, or is in a third party's post which both user A and user B are commenting on.

The analysis may take various forms and may search and obtain all communications between user A and user B using the source P and may carry out sentiment analysis in the text of the communications. A score for the relationship using source P communications may be generated 202.

A new communication from user A to user B may be generated 203 at the communication source P and sentiment analysis may be carried out 204 on the new communication resulting in a sentiment score for the new communication.

The relationship score may be updated 205 for the relationship between user A and user B at source P with the communication score of the new communication.

In an embodiment, the relationship score may be built up as new communications between the user A and the user B are analyzed and scored.

Figure 3:
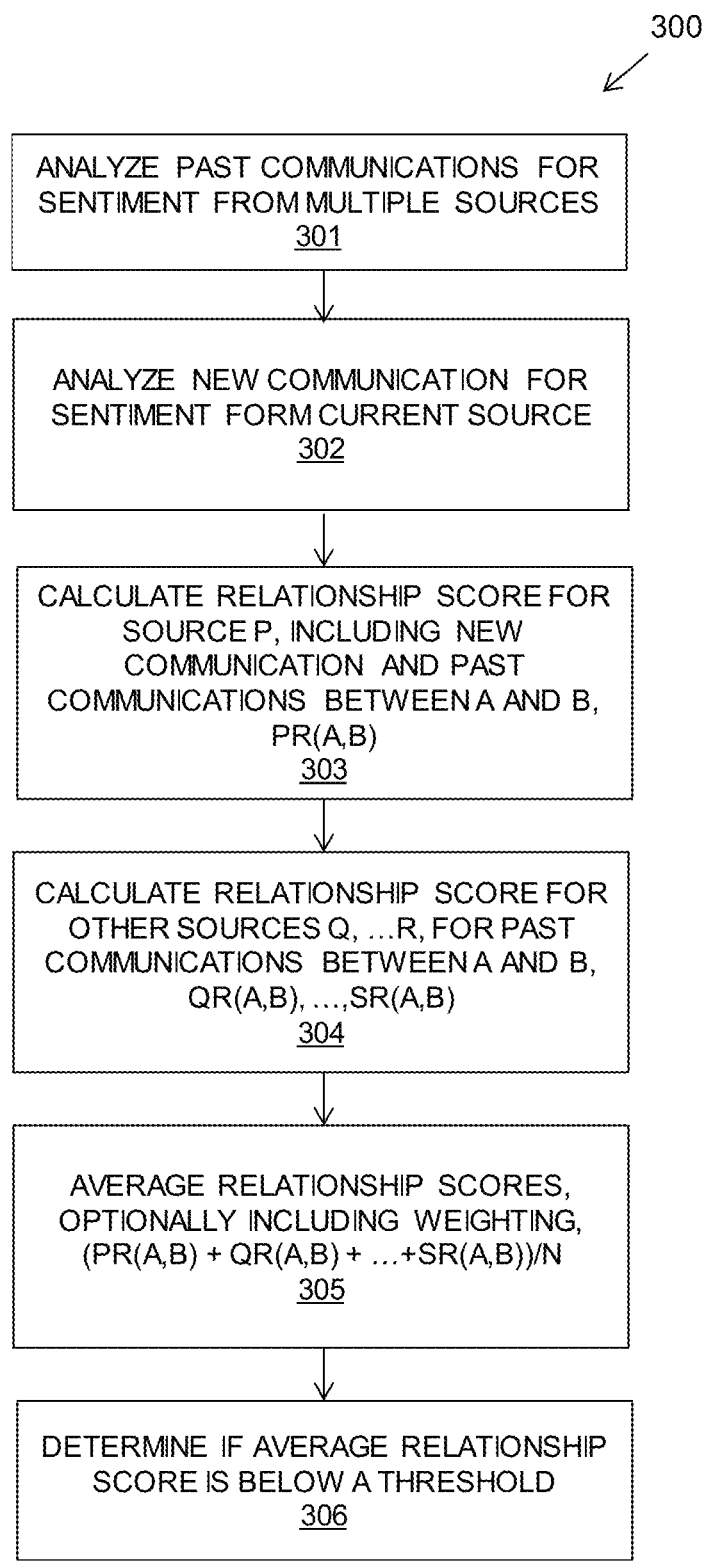
FIG. 3 is a flow diagram of an example embodiment of an aspect of a method in accordance with the present invention.

Referring to FIG. 3, a flow diagram 300 shows an example embodiment of an aspect of the described method of generating and using a relationship score based on multiple communication channel sources. In this example, multiple sources of communications are used, such as email communications, social media network communications, SMS communications, instant messaging communications, etc.

In this embodiment, a new communication is being generated from a sender A to a recipient B using a communication channel source P.

In this embodiment, past communications may be or may have already been analyzed 301 for sentiment from multiple communication channel sources. In addition, the new communication may be analyzed 302 for sentiment at the current communication channel source.

A relationship score may be calculated 303 for the communication channel source P optionally including the new communication sentiment score and sentiment scores for past communications between A and B. This may be referred to as "Source P, Relationship A,B", PR(A,B).

Relationship scores may also be calculated or may have been previously calculated and stored 304 for other communication channel sources, Q . . . S, using sentiment scores for past communications between A and B. These relationship scores may be referred to as "Source Q, Relationship A,B", QR(A,B), . . . "Source S, Relationship A,B", SR(A,B).

The relationship scores from current source P and other sources Q . . . S, may be averaged 305. For a total of N sources, this would result in an average relationship score, referred to as a real relationship score RealR:

Average Relationship Score, $RealR(A,B)=(PR(A,B)+QR(A,B)+\ldots+SR(A,B))/N$

Optionally, different sources may be weighted, for example, a higher weighting for the current source P relationship PR(A,B), or a higher weighting for sources using direct communications between A and B, or a higher weighting for sources with public communications. This may be configured depending on the situation.

In an embodiment, a more complex weighting may be applied using a monotonic multivariate function, which may take into account variables such as the sex of the author of the communication along with their age in order to determine which action to take. The culture of a country can also be taken into account as a weight of sentiment.

The average relationship score may then be compared 306 with a threshold score as described in the flow diagram 100 of FIG. 1.

A specific example embodiment is now described in which the new communication may be generated using email communication. Historical communications are used from instant messaging and social network channels.

The relationship between the sender A and the main receiver B is calculated based on current email and the history emails between them as EMR(A, B) with a score between 0-5.

The relationship between the sender A and the main receiver B is calculated based on their history of instant messages as IMR(A, B) with a score between 0-5.

The relationship between the sender A and the main receiver B is calculated based on their social media interactions such as Facebook (Facebook is a trademark of Facebook, Inc.), LinkedIn (LinkedIn is a trademark of LinkedIn Corporation), forums, etc. SMR(A,B) with a score between 0-5.

The real relationship between $A$ and $B$ will be scored by $RealR(A,B)=(EMR(A,B)+IMR(A,B)+SMR(A,B))/3$.

The lower the score, the worse relationship between these two people A and B.

If the RealR(A, B) is less then 2.5, then their relationship is bad and when the person A sends the email, the email will be held in the server side and an alert email will be sent to person A's manager or other people who have a good relationship to person A. This allows them to communicate with person A to rephrase the wording of the email before the email is sent out.

The straight averaging or weighted averaging of the real relationship score may be too restrictive. Alternative approaches may include a monotonic multivariate function.

The described method and system use sentiment analysis to build up a relationship between a message sender and a recipient. Aggregating a variety of data sources to dynamically adjust the relationship between two people helps a communicating party to tone their new communication to the right level.

The described method and system use sentiment analysis to avoid undesirable consequences of communication with negative content. This is resolved by holding the sending of defensive or offensive communications to those who have a bad relationship.

In an embodiment, sentiment analysis manifests itself when a user sending a communication is using inappropriate tone or language. If this is detected, the communication will not be sent immediately and a notification may be given to the user and perhaps another party to review the communication.

Combining relationship information gathered from social media with sentiment analysis of a current communication determines a threshold, which can be used to determine whether or not to immediately send the new communication.

As an additional feature, the method may automatically vary the signature or a picture in the communication according to the sentiment of the message. When a new communication's sentiment is analyzed, a signature that may include a picture or photograph may be automatically selected based on the sentiment. For example, a signature with a very happy smiling photograph of the sender may not be appropriate when the sentiment is slightly negative and therefore, a sterner photograph may be selected.

Figure 4:
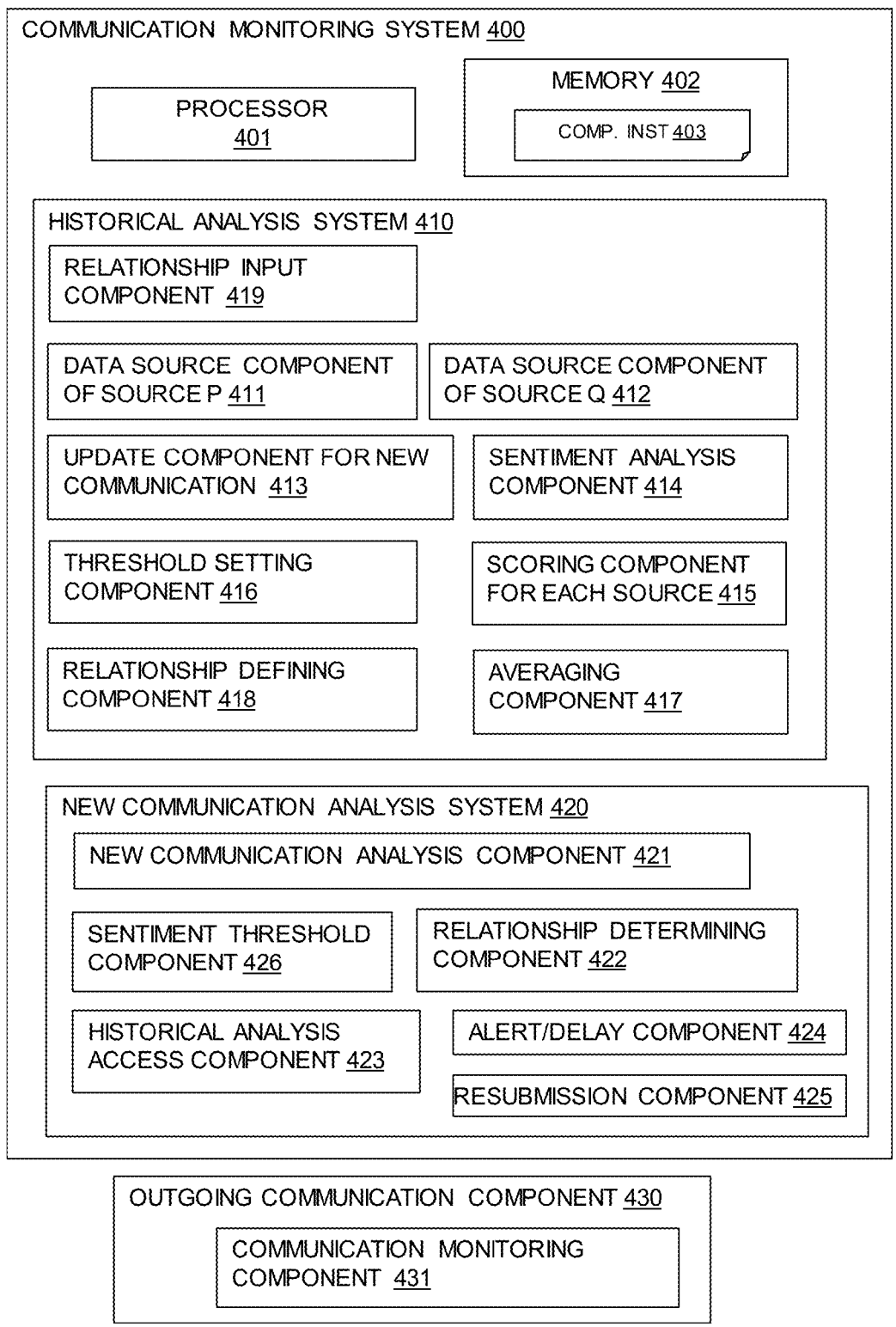
FIG. 4 is block diagram of an example embodiment of a system in accordance with the present invention.

Referring to FIG. 4, a block diagram shows an example embodiment of the described communication monitoring system 400. The communication monitoring system 400 may be provided as an extension to or incorporated into a communication system. The communication monitoring system 400 may alternatively be provided as an extension to or incorporated into a communication device or computing system and therefore may interact with a plurality of different communication systems. The communication monitoring system 400 may also be provided as a service remotely to a user via a network.

The communication monitoring system 400 may include or have access to at least one processor 401, a hardware module, or a circuit for executing the functions of the described components which may be software units executing on the at least one processor 401. Memory 402 may be configured to provide computer instructions 403 to the at least one processor 401 to carry out the functionality of the components.

The communication monitoring system 400 may include an historical analysis system 410 for providing a relationship score between two users and a new communication analysis system 420 for analyzing and processing a new communication between the two users. The communication monitoring system 400 may be in cooperation with an outgoing communication component 430 by which the new communication is being created. The outgoing communication component 430 may include a communication monitoring component 431 for monitoring a new communication.

The historical analysis system 410 may include a relationship input component 419 for inputting details of the two users for which historical relationship data is required. These details may be obtained by the communication monitoring component 431 of the outgoing communication component 430. The historical analysis system 410 may include data source components 411, 412 for obtaining past communications from different of communication sources.

The historical analysis system 410 may include an update component for a new communication 413 for embodiments in which the sentiment of a new communication is added to the historical relationship score.

The historical analysis system 410 may include: a sentiment analysis component 414 for carrying out sentiment analysis of historical communications from the communication sources, a scoring component 415 for scoring different sources of communication, an averaging component 417 for averaging the scores from different sources. The historical analysis system 410 may include a threshold setting component 416 may enable threshold settings to be used to determine different ranges of sentiment. The historical analysis system 410 may include a relationship defining component 418 may output a relationship score or definition. The relationship score may be stored for future use and update.

The new communication analysis system 420 may include a new communication analysis component 421 for determining a sentiment of the new communication and a sentiment threshold component 426 may enable a threshold of negative sentiment for a new communication to be set. The new communication analysis system 420 may include an historical analysis access component 423 may access an historical relationship score for the users from the historical analysis system 410. The new communication analysis system 420 may include a relationship determining component 422 which may determine if the relationship merits action on the new communication. The new communication analysis system 420 may also include an alert/delay component 424 which may hold the new communication 413 and, optionally, provide an alert or notification to the user or another supervising person. The new communication analysis system 420 may include a resubmission component 425 may resubmit an amended new communication for sentiment analysis by the new communication analysis component 421.

Figure 5:
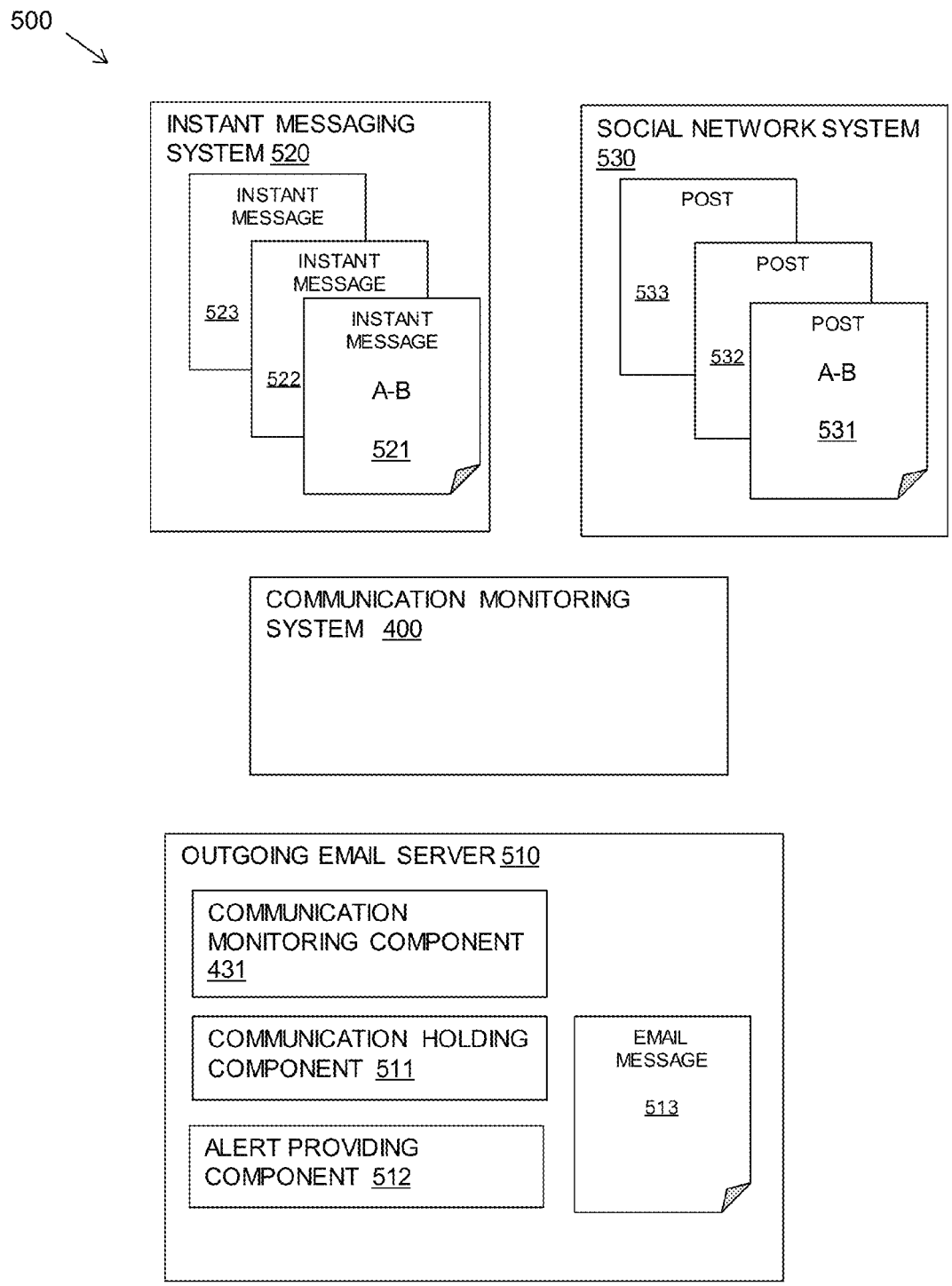
FIG. 5 is a block diagram of an example embodiment of a system in accordance with the present invention.

Referring to FIG. 5, an example embodiment shows a system 500 in which a new communication is generated using an email communication. A new email message 513 is shown in an outgoing email server 510. This may alternatively be provided in an email client.

The outgoing email server 510 may include a communication monitoring component 431 as described in FIG. 4. The outgoing email server 510 may include a communication holding component 511 for holding a communication if it is determined by the communication monitoring system 400 that it should not be sent without further review. The outgoing email server 510 may also include an alert providing component 512 for alerting the user or a supervising person that the new email message 513 may be inappropriate.

FIG. 5 shows historical communications which may be obtained from an instant messaging system 520 with messages 521-523 between the users involved in the new email message 513 and from a social network system 530 with posts 531-533 between the users involved in the new email message 513.

The communication monitoring system 400 as described in FIG. 4 may use the historical communications from the instant messaging system 520 and the social network system 530 to evaluate the level of the relationship between the parties of the new email message 513.

Figure 6:
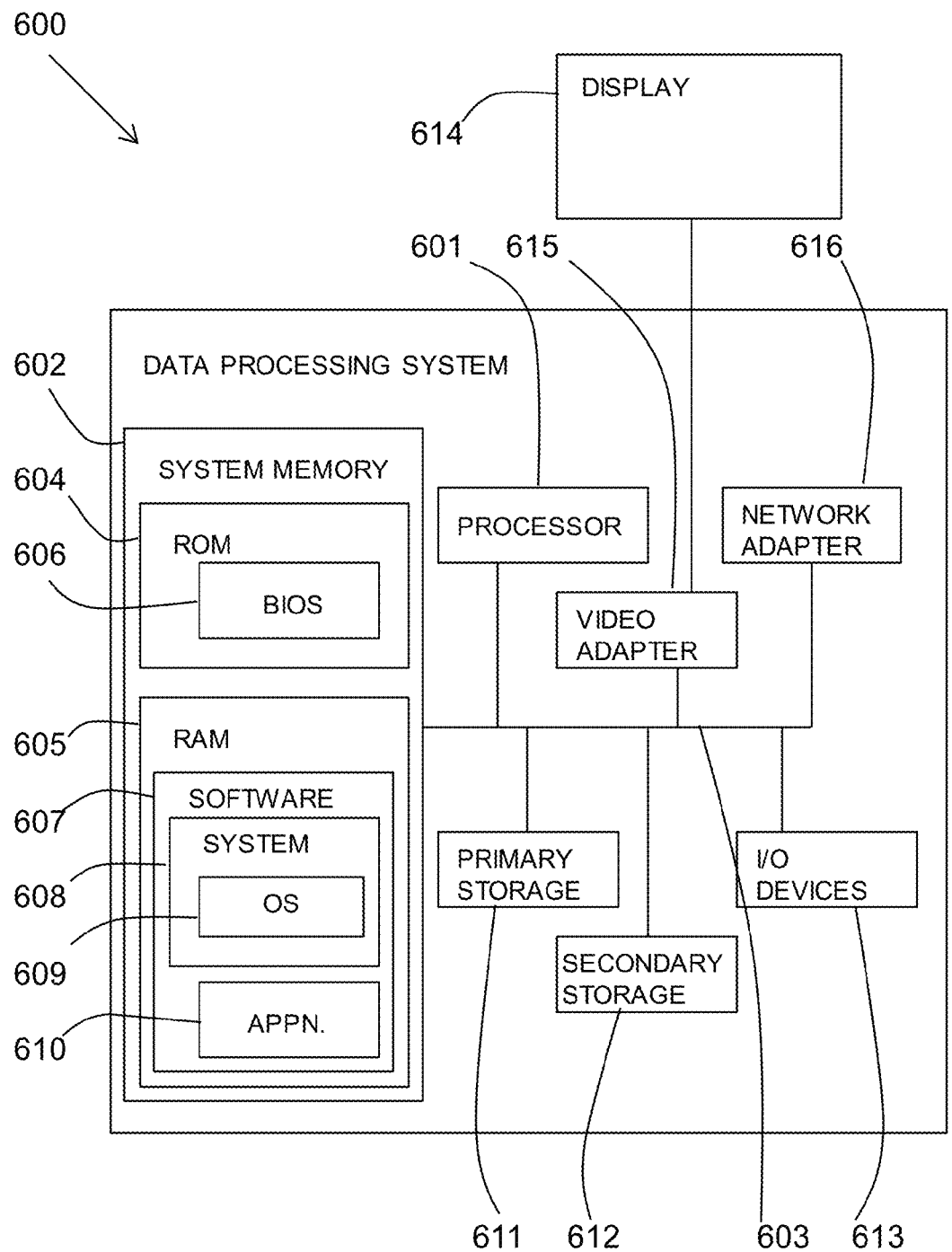
FIG. 6 is a block diagram of an embodiment of a computer system in which the present invention may be implemented.

Referring to FIG. 6, an exemplary system for implementing aspects of the invention includes a data processing system 600 suitable for storing and/or executing program code including at least one processor 601 coupled directly or indirectly to memory elements through a bus system 603. The memory elements may include local memory employed during actual execution of the program code, bulk storage, and cache memories which provide temporary storage of at least some program code in order to reduce the number of times code must be retrieved from bulk storage during execution.

The memory elements may include system memory 602 in the form of read only memory (ROM) 604 and random access memory (RAM) 605. A basic input/output system (BIOS) 606 may be stored in ROM 604. Software 607 may be stored in RAM 605 including system software 608 such as operating system software 609. Software applications 610 may also be stored in RAM 605.

The data processing system 600 may also include a primary storage means 611 such as a magnetic hard disk drive and secondary storage means 612 such as a magnetic disc drive and an optical disc drive. The drives and their associated computer-readable media provide non-volatile storage of computer-executable instructions, data structures, program modules and other data for the data processing system 600. Software applications may be stored on the primary and a secondary storage means 611, 612 as well as the system memory 602.

The data processing system 600 may operate in a networked environment using logical connections to one or more remote computers via a network adapter 616.

Input/output devices 613 may be coupled to the system either directly or through intervening I/O controllers. A user may enter commands and information into the data processing system 600 through input devices such as a keyboard, pointing device, or other input devices (for example, microphone, joy stick, game pad, satellite dish, scanner, or the like). Output devices may include speakers, printers, etc. A display device 614 is also connected to the bus system 603 via an interface, such as video adapter 615.

Figure 7:
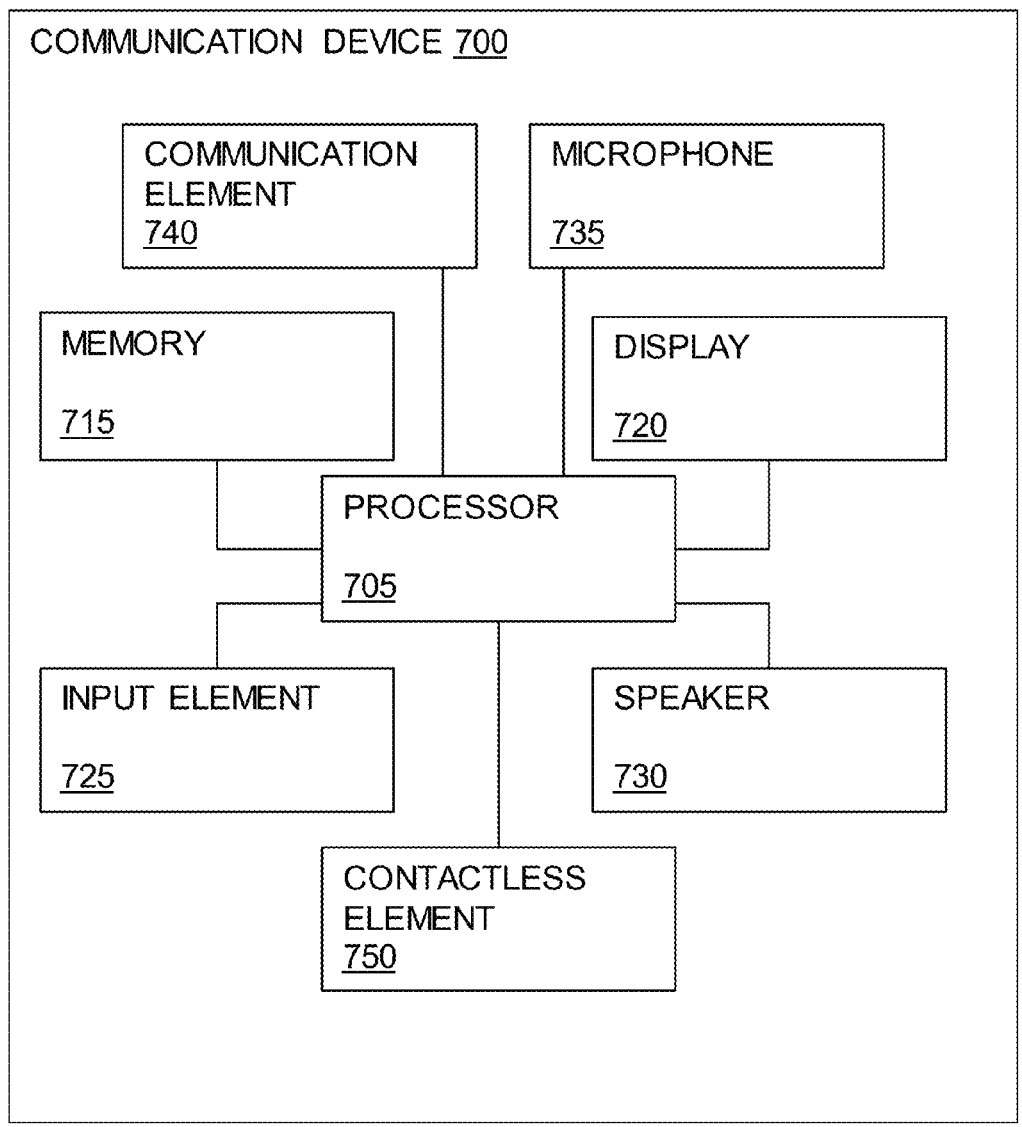
FIG. 7 is a block diagram of a communication device in which the present invention may be implemented.

FIG. 7 shows a block diagram of a communication device 700 that may be used in embodiments of the disclosure. The communication device 700 may be a cell phone, a feature phone, a smart phone, a satellite phone, or a computing device having a phone capability, including a wearable device such as glasses, watches, etc.

The communication device 700 may include a processor 705 (e.g., a microprocessor) for processing the functions of the communication device 700 and a display 720 to allow a user to see the phone numbers and other information and messages. The communication device 700 may further include an input element 725 to allow a user to input information into the device (e.g., input buttons, touch screen, etc.), a speaker 730 to allow the user to hear voice communication, music, etc., and a microphone 735 to allow the user to transmit his or her voice through the communication device 700.

The processor 705 of the communication device 700 may connect to a memory 715. The memory 715 may be in the form of a computer-readable medium that stores data and, optionally, computer-executable instructions.

The communication device 700 may also include a communication element 740 for connection to communication channels (e.g., a cellular telephone network, data transmission network, Wi-Fi network, satellite-phone network, Internet network, Satellite Internet Network, etc.). The communication element 740 may include an associated wireless transfer element, such as an antenna.

The communication element 740 may include a subscriber identity module (SIM) in the form of an integrated circuit that stores an international mobile subscriber identity and the related key used to identify and authenticate a subscriber using the communication device 700. One or more subscriber identity modules may be removable from the communication device 700 or embedded in the communication device 700.

The communication device 700 may further include a contactless element 750, which is typically implemented in the form of a semiconductor chip (or other data storage element) with an associated wireless transfer element, such as an antenna. The contactless element 750 may be associated with (e.g., embedded within) the communication device 700 and data or control instructions transmitted via a cellular network may be applied to the contactless element 750 by means of a contactless element interface (not shown). The contactless element interface may function to permit the exchange of data and/or control instructions between mobile device circuitry (and hence the cellular network) and the contactless element 750.

The contactless element 750 may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device 700 and an interrogation device. Thus, the communication device 700 may be capable of communicating and transferring data and/or control instructions via both a cellular network and near field communications capability.

The data stored in the memory 715 may include: operation data relating to the operation of the communication device 700. A user may transmit this data from the communication device 700 to selected receivers.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for communication monitoring based on sentiment, comprising:
    monitoring a new communication prior to sending created by a sender to a recipient, wherein the new communication comprises text input by the sender;
    analyzing the text of the new communication using sentiment analysis and determining a sentiment score on a scale between negative sentiment and positive sentiment;
    referencing an overall relationship score based on past communications between the sender and the recipient in response to the sentiment score for the text of the new communication being on a negative side of a first predefined threshold on the scale;
    holding a transmission of the new communication or activating another action in response to the overall relationship score being on the negative side of a second predefined threshold; and
    sending a notification to at least one of the sender or a supervisor of the sender in response to the overall relationship score being on the negative side of the second predefined threshold.

2. The method as claimed in claim 1, wherein the overall relationship score is generated by performing sentiment analysis on text content of past communications between the sender and the recipient and determining the sentiment score on the scale between negative sentiment and positive sentiment.

3. The method as claimed in claim 1, wherein the overall relationship score is generated by performing sentiment analysis on text content of past communication between the sender and the recipient from multiple communication channel sources.

4. The method as claimed in claim 1, wherein the overall relationship score is based on a weighted average of sentiment analysis of text content from multiple communication channel sources.

5. The method as claimed in claim 1, wherein multiple communication channel sources comprise sources from a group of: email communication channels, instant messaging communication channels, short message service communication channels, social media network communication channels, online forum channels, and other forms of communication channel sent from a computing device or mobile communication device.

6. The method as claimed in claim 1, comprising updating the overall relationship score based on the sentiment score for the new communication.

7. The method as claimed in claim 1, further comprising:
    resubmitting an amended new communication for analyzing the text of the amended new communication using sentiment analysis and determining the sentiment score on the scale between negative sentiment and positive sentiment.

8. The method as claimed in claim 1, further comprising:
    selecting a signature for the communication from a plurality of signatures each having a different sentiment, wherein the selection is based on the sentiment score of the new communication.

9. A non-transitory computer program product for communication monitoring based on sentiment, the computer program product comprising:
    one or more non-transitory computer-readable storage media and program instructions stored on the one or more non-transitory computer-readable storage media, the program instructions comprising:
    program instructions to monitor a new communication prior to sending created by a sender to a recipient, wherein the new communication comprises text input by the sender;
    program instructions to analyze the text of the new communication using sentiment analysis and program instructions to determine a sentiment score on a scale between negative sentiment and positive sentiment;
    program instructions to reference an overall relationship score based on past communications between the sender and the recipient in response to the sentiment score for the text of the new communication being on a negative side of a first predefined threshold on the scale;

program instructions to hold a transmission of the new communication or activating another action in response to the overall relationship score being on the negative side of a second predefined threshold in response to the overall relationship score being on the negative side of a second predefined threshold; and program instructions to send a notification to at least one of the sender or a supervisor of the sender in response to the overall relationship score being on the negative side of the second predefined threshold.

10. The computer program product as claimed in claim 9, wherein the overall relationship score is generated by program instructions to perform sentiment analysis on text content of past communications between the sender and the recipient and program instructions to determine the sentiment score on the scale between negative sentiment and positive sentiment.

11. The computer program product as claimed in claim 9, wherein the overall relationship score is generated from program instructions to perform sentiment analysis on text content of past communication between the sender and the recipient from multiple communication channel sources.

12. The computer program product as claimed in claim 9, wherein the overall relationship score is based on program instructions to create a weighted average of sentiment analysis of text content from multiple communication channel sources.

13. The computer program product as claimed in claim 9, wherein multiple communication channel sources comprise sources from a group of: email communication channels, instant messaging communication channels, short message service communication channels, social media network communication channels, online forum channels, and other forms of communication channels sent from a computing device or mobile communication device.

14. The computer program product as claimed in claim 9, comprising program instructions to update the overall relationship score based on the sentiment score for the new communication.

15. The computer program product as claimed in claim 9, further comprising:

program instructions to resubmit an amended new communication for analyzing the text of the amended new communication using sentiment analysis and program instructions to determine the sentiment score on the scale between negative sentiment and positive sentiment.

16. The computer program product as claimed in claim 9, further comprising:

program instructions to select a signature for the communication from a plurality of signatures each having a different sentiment, wherein the program instructions to select is based on the sentiment score of the new communication.

17. A computer system for communication monitoring based on sentiment, the computer system comprising:

one or more computer processors, one or more non-transitory computer-readable storage media, and program instructions stored on one or more of the one or more non-transitory computer-readable storage media for execution by at least one of the one or more processors, the program instructions comprising:

program instructions to monitor a new communication prior to sending created by a sender to a recipient, wherein the new communication comprises text input by the sender;

program instructions to analyze the text of the new communication using sentiment analysis and program instructions to determine a sentiment score on a scale between negative sentiment and positive sentiment;

program instructions to reference an overall relationship score based on past communications between the sender and the recipient in response to the sentiment score for the text of the new communication being on a negative side of a first predefined threshold on the scale;

program instructions to hold a transmission of the new communication or activating another action in response to the overall relationship score being on the negative side of a second predefined threshold in response to the overall relationship score being on the negative side of a second predefined threshold; and program instructions to send a notification to at least one of the sender or a supervisor of the sender in response to the overall relationship score being on the negative side of the second predefined threshold.

18. The computer system as claimed in claim 17, wherein the overall relationship score is generated by program instructions to perform sentiment analysis on text content of past communications between the sender and the recipient and program instructions to determine the sentiment score on the scale between negative sentiment and positive sentiment.

19. The computer system as claimed in claim 17, wherein the overall relationship score is generated from program instructions to perform sentiment analysis on text content of past communication between the sender and the recipient from multiple communication channel sources.

20. The computer system as claimed in claim 17, wherein the overall relationship score is based on program instructions to create a weighted average of sentiment analysis of text content from multiple communication channel sources.

* * * * *